United States Patent [19]

Lindros

[11] 4,072,132

[45] Feb. 7, 1978

[54] ROTARY INTERNAL COMBUSTION ENGINE

[75] Inventor: Chester A. Lindros, San Francisco, Calif.

[73] Assignee: Mighty-Mini Rotary Engine, Limited, San Francisco, Calif.

[21] Appl. No.: 718,346

[22] Filed: Aug. 27, 1976

[51] Int. Cl.² ............................................. F02B 53/04
[52] U.S. Cl. ................................. 123/8.13; 123/43 R; 123/25 R; 123/8.45
[58] Field of Search ................... 123/8.45, 8.31, 8.33, 123/8.17, 8.05, 8.09, 8.35, 25 R, 25 C, 43 R, 43 C, 8.25

[56] References Cited

U.S. PATENT DOCUMENTS

| 1,318,017 | 10/1919 | Shank | 123/25 C |
| 1,405,326 | 1/1922 | Powell | 123/8.17 |
| 1,849,398 | 3/1932 | Bracco | 123/8.35 |
| 3,438,358 | 4/1969 | Porsch | 123/43 C |
| 3,687,117 | 8/1972 | Panariti | 123/25 R |
| 3,960,116 | 6/1976 | Ingham | 123/8.45 |

Primary Examiner—Clarence R. Gordon
Attorney, Agent, or Firm—John J. Leavitt

[57] ABSTRACT

Presented is a rotary internal combustion engine that utilizes autoignition of fuel and water injection into the combustion chamber for greater efficiency and reduction of pollutants.

27 Claims, 6 Drawing Figures

ROTARY INTERNAL COMBUSTION ENGINE

BACKGROUND OF THE INVENTION

1. Field Of The Invention

This invention relates to rotary internal combustion engines and particularly to such an engine that utilizes autoignition of fuel and water injection into the combustion chamber to increase efficiency, and which also reduces pollution through the injection of water into the combustion chamber.

2. Description Of The Prior Art

The concept of a rotary internal combustion engine is one that presently forms the basis for a great development effort. The reason for such development effort is that it has been found that the rotary internal combustion engine involves mechanical principals that increase the economy of an internal combustion engine. Additionally, because of the relatively fewer number of moving parts in a rotary internal combustion engine, as compared with a conventional reciprocating internal combustion engine, there is less likelihood for wear and consequent breakdowns with attendant expenses. The concept of a rotary engine or motor has of course been incorporated in many different structures.

For instance U.S. Pat. No. 805,162 teaches the concept of a rotary steam engine. U.S. Pat. No. 1,222,475 relates to a rotary internal combustion engine and includes an outer housing cylindrical in configuration and adapted to receive a concentric rotary drive shaft on which is mounted a rotor. On the outer periphery of the rotor are formed combustion chambers in association with each of which is pivotally journaled a piston blade movable between intake, compression, power and exhaust positions by the configuration of the internal periphery of the housing.

U.S. Pat. No. 1,790,256 relates to an internal combustion engine of the rotary type and includes an outer cylindrical housing having an inner periphery divided into four quadrants. Two opposed quadrants are concentric to the central axis of the housing while the remaining two quadrants are elliptical in configuration and cooperate with the circular periphery of the rotor within the housing to effect movement of swing vanes or wings pivotally mounted adjacent the outer periphery of the rotor in association with recesses formed therein. Each of the swing vanes is provided with an aperture or recess in its outer end and cooperates with a valve to trap within such recess a quantity of fuel-air mixture and effect its release at appropriate intervals during which a spark ignites the mixture causing expansion of the products of combustion against the recessed end of the piston, which in turn causes rotary motion of the rotor.

U.S. Pat. No. 1,849,398 is also directed to an internal combustion engine of the rotary type and utilizes an outer housing circular in configuration yet having at 180° opposed positions, pockets which form combustion chambers in cooperation with impact members, each of which includes a compression member movable in relation to the impact member by a generally oval shaped cam. The impact member and compression member are pivotally mounted adjacent the outer periphery of a rotor adapted to be rotated within the inner periphery of the casing as shown.

U.S. Pat. No. 2,915,048 is directed to a hydraulic motor rather than to an internal combustion engine, but is interesting in that even though this is a different type motor, it stills requires the use of an external housing generally cylindrical in configuration and incorporating therewithin a rotatable rotor on the outer periphery of which are mounted a plurality of vanes adapted to swing outwardly in certain positions of the rotor so that the vanes come into sliding contact with the inner periphery of the housing.

U.S. Pat. No. 2,951,469 also relates to a hydraulic type motor rather than an internal combustion engine. This motor utilizes an outer housing having pockets formed in the housing as opposed to being formed in the rotor. Within the housing there is a rotor having pivotally mounted thereon a plurality of vanes which function to displace hydraulic fluid when the casing is rotated in relation to the shaft.

U.S. Pat. No. 3,855,977 provides a cylindrical outer housing having an interior periphery within which is arranged to rotate a rotor having pivotally mounted adjacent its outer periphery a plurality of pistons which are carried in a circular path by the rotor. The pistons are caused to oscillate radially with respect to the housing and the rotor by trunnion pins acting in a cam groove formed in the end plates of the housing. Formed on the outer periphery of each of the pistons is a recess for containing the compressed air-fuel mixture when each of the pistons has been moved into a "compression" position. This internal combustion engine requires 180° rotation for a complete cycle from intake to exhaust, thus providing for two of the pistons to be in a "power mode" at any given time.

From the above it will be seen that while the broad concept of a rotary type engine or motor has been known in the art for sometime, being used variously with steam injection principles and with hydraulic principles and even with internal combustion principles, surprisingly none of these prior art patents combine the concepts of a rotary internal combustion engine with the concepts of fuel injection to provide autoignition because of the pressure and heat cycles generated by the internal combustion engine, nor do any of these prior art patents teach the concept of water injection into such a rotary internal combustion engine capable of autoignition so as to increase the efficiency of such an engine.

With respect to the broad concept of water injection into a conventional internal combustion engine it is noted that this broad concept is known from the prior art. For instance, U.S. Pat. No. 1,966,671 is directed to an internal combustion reciprocating piston engine that teaches the concept of water injection into the combustion chamber of the reciprocating piston engine. U.S. Pat. No. 2,551,073 relates to the specific construction of a water injector for an internal combustion reciprocating piston engine rather than to the combination of a water injection principle in a rotary internal combustion engine. U.S. Pat. No. 2,777,430 is directed to a diesel-type engine that utilizes the concept of separate injection of water and fuel into a combustion chamber. The patent is directed to the concept of separation of the burning fuel from the injected water. Again, the engine in question is a reciprocating type engine.

U.S. Pat. No. 2,789,753 relates to water injection apparatus for a conventional reciprocating type internal combustion engine. Injection of the water is dependent upon the pressure developed by the explosion of the fuel mixture in the combustion chamber. U.S. Pat. No. 3,050,044 teaches the concept of utilizing radiator water as the source of liquid to be injected into the induction system of a conventional reciprocating type internal combustion engine. Similarly, U.S. Pat. No. 3,139,873 teaches the concept of injecting water and exhaust gases into the induction system of a conventional reciprocating type internal combustion engine. U.S. Pat. No. 3,763,832 teaches the concept of injection of water in successive charges into the combustion space in an internal combustion reciprocating type engine as a result of the pressure generated in such space by an explosion.

From the above patents it will be seen that the broad concept of water injection into an internal combustion engine of the "conventional" type is old in the art. It is surprising however that to my knowledge the prior art has not revealed the combination of a rotary internal combustion engine that utilizes both water injection and fuel injection so as to provide autoignition of such fuel mixture.

With the foregoing in mind, it is therefore one of the objects of the present invention to provide a rotary internal combustion engine that utilizes both fuel and water injection, the injection cycle of both being controlled so as to increase the efficiency of the engine.

Another object of the invention is to provide a rotary internal combustion engine of small size in comparison to the horse power rating of the engine.

A still further object of the invention is to provide a rotary internal combustion engine that utilizes relatively few moving parts so as to minimize the possibility of breakdown of such an engine and to facilitate repair thereof.

A still further object of the invention is to provide a two stroke rotary internal combustion engine.

Still another object of the invention is to provide a rotary internal combustion engine of the two stroke type that is capable of high speeds in the area of 2,000 to 3,500 revolutions per minute for extended periods without undue wear upon the engine components.

Rotary internal combustion engines have historically had difficulty with engine seals. Obviously, an effective seal must be made between the rotor and the housing within which the rotor rotates in order for the engine to effectively deliver power as a result of the combination taking place within the combustion chambers. Maintaining the integrity of these seals has been a continuing problem. Accordingly, another object of the present invention is to provide a seal structure and method which includes scavenging combustion cylinder or cavity pressure and applying such pressure behind the seals so that the effectiveness of the seal is controlled by the combustion chamber pressure.

The rotary internal combustion engine has been touted as being one which generates very little vibration. It has been found that the amount of vibration developed by an internal combustion engine, whether it be of the rotary type or the reciprocating type, depends to a large extend on the number of combustion chambers and the number of such combustion chambers that are "fired" in any given revolution of the engine. Accordingly, it is still another object of the present invention to provide a two stroke engine utilizing at least so-called "pistons" operating in association with appropriately configured "combustion chambers," with all six of these pistons being subjected to combustion of a fuel mixture within the associated combustion chamber three times within each revolution of the rotor so as to provide a more balanced engine.

Another problem with regard to rotary internal combustion engines has been the difficulty with which such engines could be scaled up or down to meet the demands of various applications. For instance, so far as is known, rotary internal combustion engines have been used primarily for driving automobiles. Other industries such as the construction industry and the boating industry could utilize the advantages of a rotary internal combustion engine if such engines can be scaled up or down to meet the demands of these particular fields. Accordingly, a still further object of the invention is to provide a rotary internal combustion engine designed to be easily scaled up or down to increase or decrease its horsepower rating.

The invention possesses other objects and features of advantage, some of which, with the foregoing, will be apparent from the following description and the drawings. It is to be understood however that the invention is not limited to the embodiment illustrated and described, since It may be embodied in various forms within the scope of the appended claims.

SUMMARY OF THE INVENTION

In terms of broad inclusion, the rotary internal combustion engine of the invention comprises an outer cylindrical casing or housing closed at each opposite end by an appropriate end plate. The end plates are provided with appropriately configured cam grooves, and a shaft extends through the end plates through appropriate bearings. Mounted on the shaft within the housing are spaced rotor plates having an annular configuration and which are appropriately keyed to the shaft for rotation therewith. Mounted or formed integrally between the rotor plates, each of which is spaced just inside one of the end plates of the housing, with appropriately sealing means therebetween, are a plurality of separator members each of which is provided with an air passage to receive air blown into the housing, preferably through the central shaft. Also mounted on and between the rotor plates and between adjacent separator members are a plurality of segments in the nature of "pistons", each having an arm provided with a bearing that operates in the cam groove of each associated end plate. Each of the segments or "pistons" is also pivoted by appropriate trunnions to the rotor plates so that as the rotor plates rotate, carrying the segments therewith, the relationship of the outer surface or periphery of each of the segments with the inner periphery of the cylindrical casing varies as the segments proceed around the axis of the shaft. The relationship between the outer peripheral surface of each segment and the inner peripheral surface of the housing varies between formation of a combustion chamber in which the outer periphery of each segment is sealingly associated with the inner periphery of the housing to contain a fuel-air charge, to a retracted position in which air is blown through the separator member and scavenges the products of combustion from the space between the traveling segment and the interior surface of the rotor end plates. At appropriate intervals in the cycle, fuel is injected into the combustion chamber and water is injected into a cavity formed adjacent the trailing end of the segment. Appropriate sealing means are provided on associated sides of each segment to contain the products of combustion in selected areas. Means are provided forming no part of this invention for injecting water and a fuel mixture into the combustion area.

DESCRIPTION OF THE PREFERRED EMBODIMENT

Figure 1:
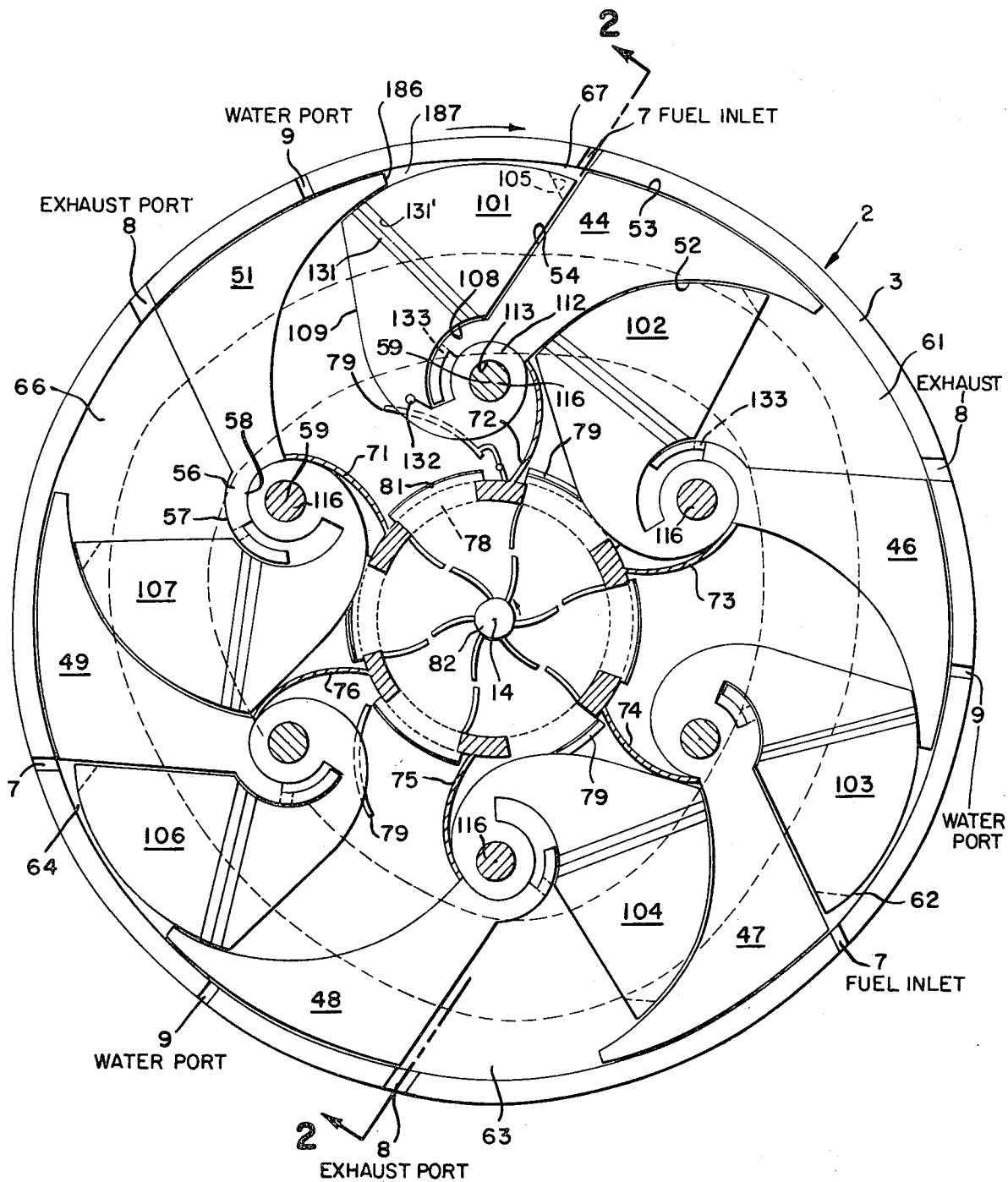
FIG. 1 is an end elevational view showing the internal construction and arrangement of the rotor and piston segments, one end plate of the rotor and housing having been removed.

In terms of greater detail, the rotary internal combustion engine of the invention comprises an outer housing designated generally by the numeral 2 and including a heavy cylindrical wall number 3 closed at each opposite end by end walls 4 and 6, the end walls being integral with the cylindrical wall 3 for maximum rigidity and strength. In this regard, it should be noted that no attempt has been made in the drawings to show every detail of construction of the rotary internal combustion engine, it being understood that conventional tool and die practices may be utilized to achieve the desired configuration. For instance, the cylindrical wall 3 might be formed from a heavy cylinder cut to length while the end walls 4 and 6 might be annular plates having their peripheries welded to the inner periphery of the cylindrical wall 3. On the other hand, the end wall 3 and plates 4 and 6 might be formed in an appropriate configuration by a machining process or by a casting process.

Formed in the outer peripheral wall 3 and giving access to the interior of the housing, are fuel injection openings or ports 7, there being three such fuel injection ports spaced equidistant around the periphery of the housing. For purposes of clarity, the port is illustrated as being merely an opening through the outer wall 3, it being understood that appropriate fuel injection devices forming no part of this invention and therefore not shown herein are associated with each of the fuel injection openings when the engine is assembled for operation. The fuel injection opening 7 gives access to the interior of the housing for a purpose and in a manner which will hereinafter be explained.

Also formed in the outer wall 3 of the housing are exhaust ports 8, the exhaust ports 8 opening into the interior of the housing in the same manner that fuel injection ports 7 open into the interior of the housing. Again, for purposes of simplicity and clarity in the description, there are three such exhaust port regions spaced equidistant about the cylindrical periphery of the housing. Within each region there is a multiplicity of exhaust openings or ports as viewed at the bottom of FIG. 2. Additionally, it should be understood that when the rotary internal combustion engine of the invention is assembled for operation, appropriate conduit or manifold means not forming a part of this invention and therefore not shown will be associated with each of the exhaust port regions so as to carry off the products of combustion.

Also formed in the outer wall 3 of the housing and communicating with the interior thereof are a plurality of water injection openings or ports 9, these water injection ports giving access to the interior of the housing in the same manner that the fuel injection and exhaust ports give access to the interior of the housing. As shown in FIG. 1, the water injection ports 9 are three in number and as with the other ports are spaced about the periphery of the housing in an equidistant manner, there being an important relationship between the spacing of each fuel injection port and the water injection and exhaust ports on opposite sides of each fuel injection port.

The significance of this relationship will be discussed in detail hereinafter in connection with the operation of the engine. As with the exhaust and fuel injection ports, no attempt has been made to describe in detail the type of equipment required to effect injection of water into the housing through the ports 9. Suffice it to say that conventional water injection devices are available on the market that are suitable for this purpose and which are susceptible of being timed so that the water injection may be timed in relation to the fuel injection into the housing.

Figure 2:
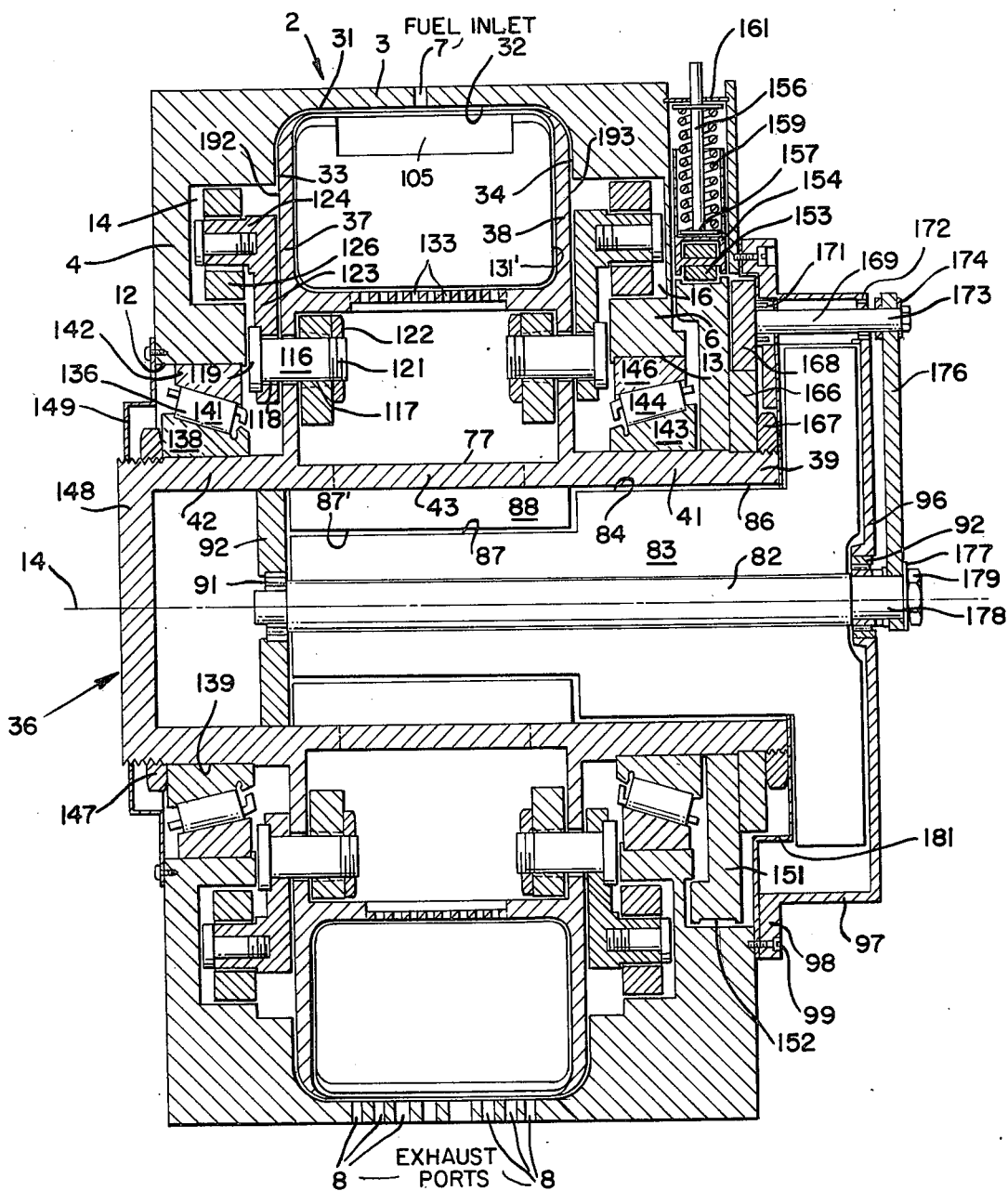
FIG. 2 is a cross-sectional view taken in the plane indicated by the line 2—2 in FIG. 1.

As illustrated in FIG. 2, the end walls 4 and 6 of the housing are provided respectively with central openings 12 and 13 symmetrical about a longitudinal axis 14 as shown. The end walls are relatively heavy in cross-section as indicated, and are provided internally with cam grooves 14 and 16, respectively. The cam grooves are specially configured in relation to the positions of the fuel injection, water inlet and exhaust ports formed in the outer periphery of the housing. This relationship is shown in detail in FIG. 5, where one of the end walls, say the end wall 4, is shown in plan view in relation to the ports 7, 8 and 9. The cam groove 14 is formed with an inner periphery 17 and an outer periphery 18, the inner and outer peripheries 17 and 18 of each cam groove being connected by the bottom 19 of the groove as illustrated.

Figure 5:
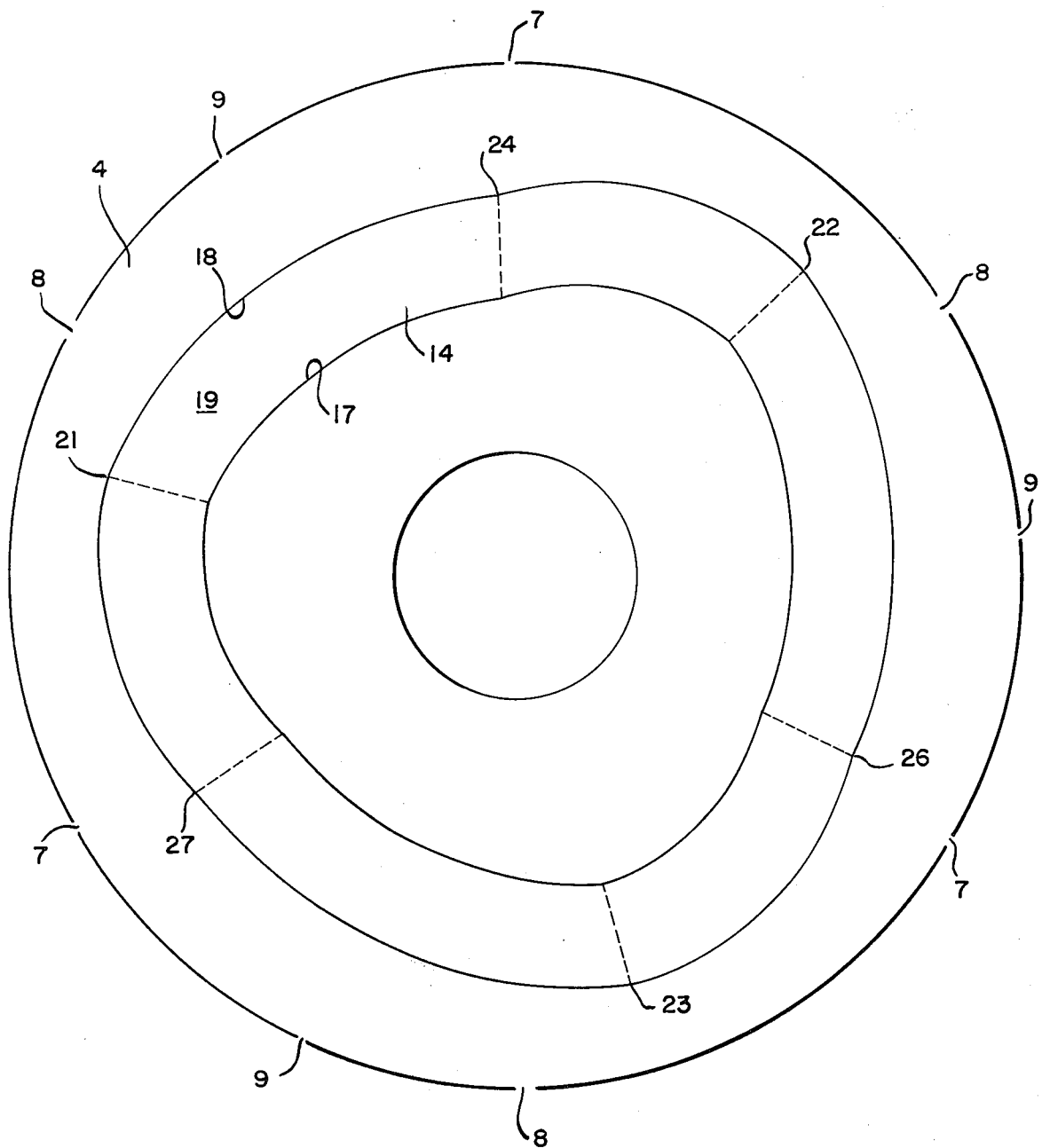
FIG. 5 is a plan view illustrating the configuration of the cam grooves formed in the outer plates of the housing.

It should be understood that for maximum efficiency in the operation of the rotary internal combustion engine, it is important that the cam grooves be formed with considerable accuracy. As illustrated in FIG. 5, each of the cam grooves is formed with a plurality of high points at the locations 21, 22 and 23 in both the inner and outer periphery of the cam groove. In like manner, the inner and outer periphery of each cam groove is also provided with low points at locations designated by the numerals 24, 26 and 27.

It should be noted that the high points of the cam grooves alternate with the low points and that the circumferential distance measured between the high spot 22 and the low spot 24 is equal to the circumferential distance measure between the high spot 21 and the low spot 27 and the high spot 23 and the low spot 26. In like manner, the circumferential distance of each cam groove between a high spot 21 and a low spot 24 is exactly the same as the circumferential distance between high spot 22 and low spot 26 on the cam grooves, and high spot 23 and low spot 27. At any given point the circumference of the housing, it is therefore possible to determine with considerable preciseness the direction in which a cam roller following the cam groove will move, it being understood that a cam roller following the cam groove will sometimes move toward the central axis 14 while at other times it will move away from the central axis 14. The significance of the movement of such a cam roller will be hereinafter explained.

Because the rotary internal combustion engine is preferably fabricated so as to operate in an autoignition mode, it is important that both the end walls 4 and 6 and the cylindrical wall 3 be of relatively heavy cross-section so as to withstand the heat and pressures that are inherent in such a system. Accordingly, the cylindrical housing wall 3 is preferably formed with a centrally disposed circumferential channel designated generally by the numeral 31, the channel being formed by the inner peripheral wall 32 of the cylindrical housing and side wall portions 33 and 34.

The circumferential channel 31 thus forms a very accurately dimensioned channel within which may be mounted and rotated a rotor designated generally by the numeral 36 and generally comprising radially extending annular plate members 37 and 38 spaced apart axially as illustrated in FIG. 2, the inner periphery of each of the plates 37 and 38 being appropriately mounted for rotation on a rotor shaft designated generally by the numeral 39. The rotor shaft is symmetrical about a longitudinal axis 14, and includes a bearing portion 41 at one end, a bearing portion 42 at the opposite end, a central portion 43 disposed between the bearing portions 41 and 42, the central portion 43 of the shaft also being disposed between the radially extending annular rotor plates 37 and 38.

As illustrated in FIG. 1, also forming a part of the rotor and preferably being formed integral with the side walls or plates 37 and 38, are divider sections 44, 46, 47, 48, 49 and 51, the divider sections being formed so that they extend between the end plates 37 and 38 at circumferentially equally spaced locations about the central axis 14, each of the divider sections being formed with a concave surface 52, a convex surface 53 corresponding to the curvature of the inner periphery 32 of the channel 31 formed in the housing and constituting the outer periphery of the rotor, and a trailing surface 54 intercepting the convex surface 53 and extending generally radially therefrom to terminate in a semicylindrical section 56. It should be noted that the semicylindrical section 56 is integral with the divider section and that the outer peripheral surface 57 of the semicylindrical section 56 merges with the trailing side 54 of the divider section, while the inner peripheral surface 58 of the semicylindrical section intercepts the concave surface 52 of the divider section. It should also be noted that the inner and outer peripheral surfaces 58 and 57 of the semicylindrical section 56 are generally co-axially disposed about a pivot axis designated as 59.

Figure 4:
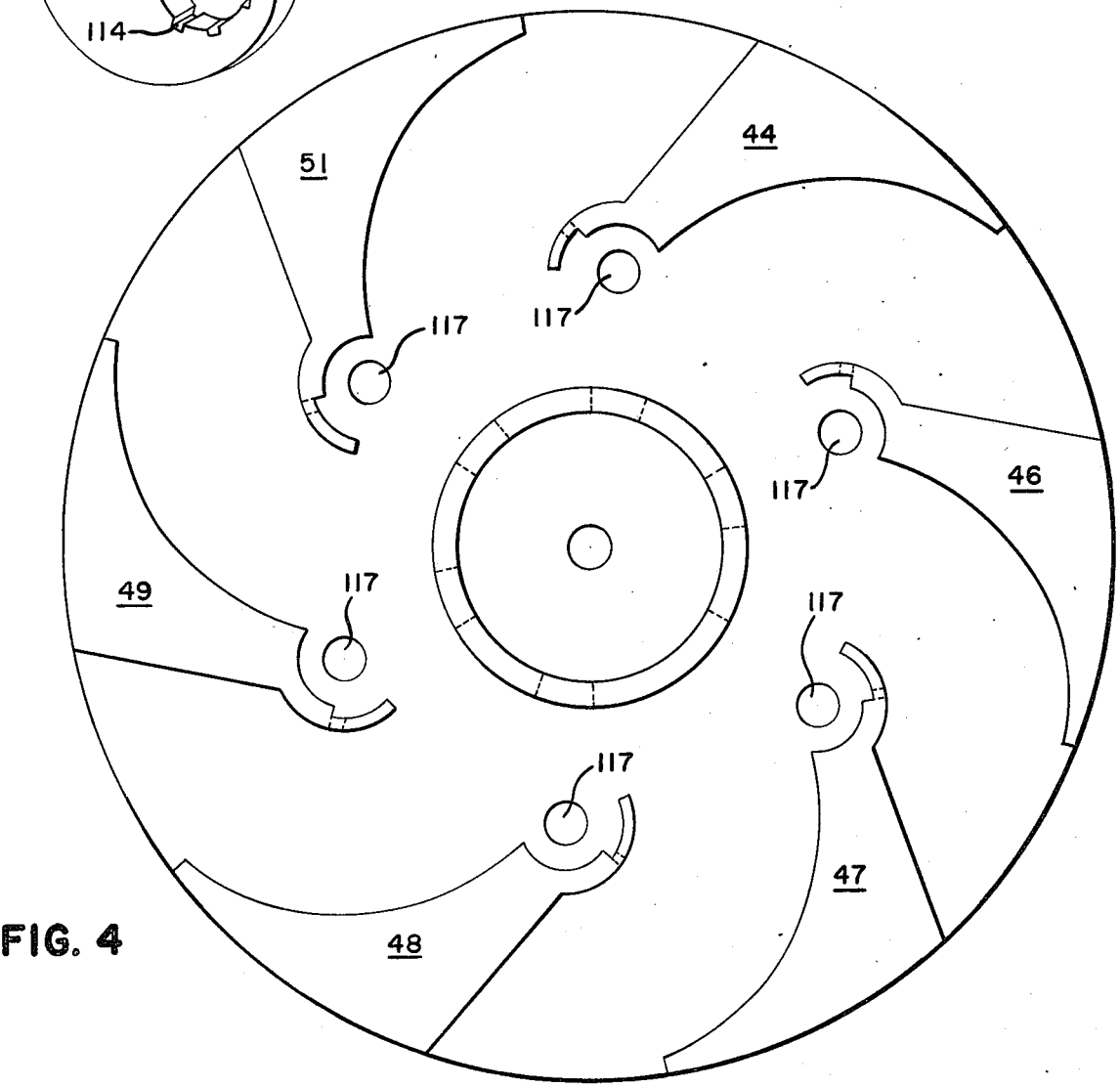
FIG. 4 is an end elevational view of the rotor apart from any other structure.

As illustrated in FIGS. 1 and 4, there are preferably six such divider sections 44, 46–49 and 51 formed about the outer peripheral portion of the rotor, each of the divider sections cooperating with the divider sections on opposite sides thereof to define therebetween a cavity for purposes which will hereinafter be explained. Thus, between the divider sections 44 and 46, there is defined a cavity 61, while between the divider sections 46 and 47, there is defined a cavity 62. In like manner, between the divider sections 47 and 48, there is defined a cavity 63 and between rotor divider sections 48 and 49 there is defined a cavity 64. Because there are six such divider sections, there is in like manner six such cavities, the cavity between divider sections 49 and 51 being designated by the numeral 66, while the cavity between divider sections 51 and 44 is designated by the numeral 67. Each of the cavities, as will be seen by comparing FIGS. 1 and 2, may be defined as a variable volume space shown at minimum capacity at 67 and at maximum capacity at reference numeral 61. The method and mechanism for varying the volume of the cavity will be explained hereinafter.

Also forming a part of the rotor 36 and being integral therewith and extending between the side walls 37 and 38, are a plurality of curtain walls 71, 72, 73, 74, 75 and 76, each of the curtain walls extending between the outer peripheral surface 77 of the central section 43 of the rotor shaft and the associated end of the concave surface 52. As illustrated in FIGS. 1 and 2, there is formed in the central section 43 of the rotor shaft a plurality of openings 78 circumferentially spaced around the periphery of the rotor shaft, each of the openings communicating the interior of the hollow rotor shaft 39 with the interior of the cavity formed between the curtain walls and the associated divider sections of which they form a continuation. Associated with each of the openings 78 in the central section 43 of the rotor shaft 39, is a flapper valve 79 mounted in a manner to cooperate with the flapper valve seal 81 in a manner which will hereinafter be explained. For the moment, suffice it to say that at appropriate timed intervals, the flapper valves 79 appropriately seal openings 78 by cooperation with the flapper seal 81. At other times, the flapper valves 79 are caused to open, permitting the passage of air from the interior of hollow shaft 39 into the space between the associated curtain walls on opposite sides of the opening. The effect of the admission of air in this manner will be explained in greater detail during the description of the operation of the engine.

In order to insure that there will be adequate flow of air through the openings 78 in the mid-section 43 of the hollow shaft, there is approximately mounted within the hollow shaft an axially disposed impeller shaft 82 having mounted thereon a plurality of impeller blades 83, there being preferably six such impeller blades 83, each having a curvature as indicated in FIG. 1, and extending radially away from the shaft 82 as shown. Rotation of the impeller shaft is in the direction indicated by the arrow in FIG. 1, being counter-clockwise as seen therein, with the outer end edges 84 of a portion of the impeller blades being next adjacent the inner peripheral surface 86 of the outer bearing portion 41 of the hollow shaft 39, the spacing between the outer edge 84 and inner surface 86 being such as to permit rotation of the impeller blades within the shaft without physical contact therebetween.

As illustrated in FIG. 2, in the area associated with the mid-section 43 of the hollow shaft, the outer edges 87 of the impeller blades are reduced in diameter and proportioned to form a close rotating fit with the outer edges 87' of fixed baffle members 88 fixed to the inner periphery of the central section 43 of the hollow rotor shaft 39. Thus, as the impeller shaft 82 is caused to rotate in a manner and by means which will hereinafter be explained, the impeller blades force air into the hollow interior of the rotor shaft 39, and cause it to move radially outwardly through the openings 78 in the mid-section 43 of the shaft, the movement of such air being controlled by the position of the flap valves 79.

It should be understood that the opening and closing of the flap valve 79 is controlled by rotation of the rotor and the rotational position of the rotor in relation to the high and low spots of the cam groove 14. It should also be understood that rotation of the impeller shaft and the associated impeller blades 83 is controlled within the limits imposed by appropriate bearing assemblies 91 and 92. The bearing assembly 91 is categorized as the rear assembly and is supported in a coaxial relation about the longitudinal axis 14 by appropriate support members 92 that not only position the axis of rotation of the impeller shaft so that it is coincident with the axis 14 of the housing, but which also absorbs any axial thrust that might be imposed on the impeller shaft. As illustrated in FIG. 2, the forward end of the impeller shaft and the bearing assembly 92 are supported on an appropriate bracket member 96 extending radially across the forward end of the engine in a spider or spoke form and joined at its outer periphery by a cylindrical wall section 97 terminating in an appropriate radial flange 98 that is detachably secured by cap screws 99 to the associated end of the housing 2.

Also considered to be a part of the rotor assembly, are a plurality of pivotal piston members 101, 102, 103, 104, 106 and 107. As illustrated in FIG. 1, the piston member 101 is associated with the cavity 67, being disposed between the rotor divider sections 51 and 54. In like manner, progressing clockwise as viewed in FIG. 1, the piston member 102 is associated with the cavity 61, while the piston member 103 is associated with the cavity 62. Piston members 104 and 106 are associated with cavities 63 and 64, respectively, while piston member 107 is associated with cavity 66. It should be noted that in each cavity the piston divides the cavity into a compression chamber behind the piston and a combustion chamber in front of the piston.

Figure 3:
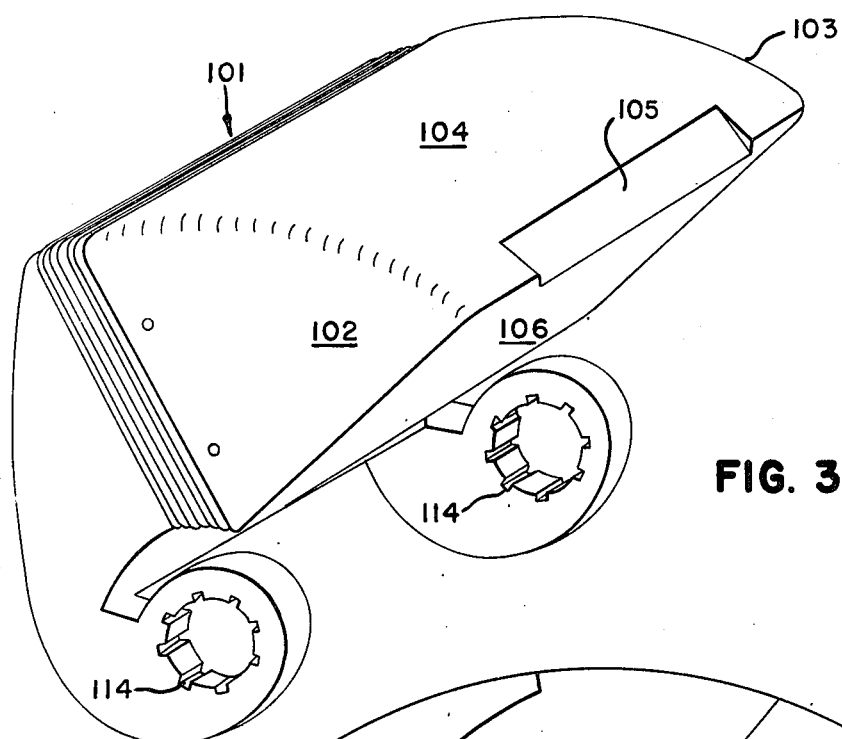
FIG. 3 is a perspective view illustrating the configuration of one of the piston segments.

In the interest of brevity, inasmuch as each of the pistons as illustrated in FIG. 3 is identical to the other pistons, the description of one such piston may be applied to all of them. Accordingly, it will be seen from FIGS. 1 and 3, that each piston includes a body portion having sides 102 and 103 joined by a convex surface 104. The curved or convex surface 104 of the piston has a curvature that corresponds to the curvature of the concave wall 52 of the associated rotor divider section 51 so that pivotal movement of the piston causes the convex surface 104 of the piston to closely coincide with the concave surface 52 of the associated divider section. Each piston 101 is also provided with a front face 106 that is generally rectangular in configuration, the front face being substantially coextensive in area with the surface 54 of the associated divider section as illustrated in FIG. 1, the surface 106 intercepting sides 102 and 103 and the curved surface 104 of the piston, there being provided in the edge formed between the face 106 and the curved surface 104 a recess 104 illustrated best in FIGS. 2 and 3. The front face 106 of the piston merges with or intercepts a concave extension 108 of the surface 106, the curvature of the extension 108 being coincident with the curvature of the outer periphery 57 of the section 56 forming an extension of the rotor divider section 51.

The back side of the piston is provided with a surface 109 which intercepts the sides 102 and 103 and the curved surface 104 of the piston while at its other end, the surface 109 of the piston curves smoothly around to terminate in its major portion at about the terminus of the curved surface 108 remote from the surface 106, a portion of the surface 109 continuing to form the outer periphery of a curved crank arm 112 projeting from the bottom end of the piston at each opposite side thereof as shown in FIG. 3. Preferably, each of the crank arms 112 is provided with an aperture 113 formed concentrically about the pivot axis 59 in each case, with the inner periphery of the aperture 113 preferably formed with circumferentially spaced grooves 114 proportioned to receive a splined bolt 116 which extends through an aperture 117 formed in the associated side 37 or 38 of the rotor.

A pair of such splined bolts are associated with each piston and is formed with splines 118 next adjacent a head 119 formed on the bolt. The bolts are arranged in relation to the rotor so that the head 119 lies outside the associated wall 37 or 38 or the rotor. Preferably, the inner end 121 of the bolt is threaded to receive a jam nut 122 to lock the splined bolt in the aperture 113 of the piston while positioning the bolt so that the bolt cooperates with the aperture 117 to provide a bearing support for the bolt.

Exteriorly of the associated walls 37 and 38 or the rotor, there is mounted on each such bolt a crank arm 123 one end of which is apertured and grooved for mounting on the splined portion 118 of the bolt next to the head 119 while the other end of the crank arm is provided with a roller mounting section 124 on which is appropriately journaled a cam roller 126. The cam roller 126, as illustrated in FIG. 2, is proportioned to make rolling contact between the inner and outer peripheries 17 and 18 of the cam groove 14. It should be understood that this construction is provided at each opposite end of each piston, and that for purposes of clarity and brevity in this description only one such crank arm assembly will be described.

From the foregoing, it will be seen that as the rotor 36 is caused to rotate within the housing 2, the apertures 117 through which the bolts 116 extend cause the bolts to rotate in a circular path about the central rotative axis 14. In so doing, as illustrated in FIG. 1, the cam roller 126, being in engagement with the inner and outer peripheries of the cam groove 14, is caused to follow the configuration of such cam groove as illustrated in FIG. 5. Thus, the crank arm 123 is forced to pivot in relation to the rotor from which it gets its impetus, and such pivotal movement of the crank arm will thus cause the bolt 116 to likewise pivot, thus carrying the piston through a limited pivotal movement by virtue of the splined interconnection of the crank arm 123 and the associated piston.

As the cam roller 126 follows the cam groove in the outer housing whatever pivotal movement of the crank arm 123 occurs will be transmitted through the splined bolt 116 to the crank arms 112 of the associated piston, causing the piston to pivot from one extreme to the other within the associated cavity. Thus, during any excursion of the cam roller 126 in the cam groove 14 which causes the cam roller to move radially toward the central axis 14, it will be noted, as viewed in FIG. 1, that the piston will be caused to pivot clockwise about the pivotal axis 59. Conversely, in any excursion of the cam roller through a section of the cam groove which causes the cam roller to move radially away from the rotational axis 14, the piston will be caused to move in a counter-clockwise direction about its pivotal axis 59.

Again refering to FIG. 1, it will be seen that the piston 101 in cavity 67 is related to the low spot 24 of the cam groove in such a way that when the cam roller 126 reaches the low spot 24 the piston will have been pivoted into its uppermost "top dead center" position and will be in a position to receive a charge of fuel through the fuel injection port 7. Continued rotation of the rotor in a clockwise direction will cause the cam roller 126 to move away from the rotative axis 14, causing the pivot arm 123 to pivot counter-clockwise, such counter-clockwise movement of the pivot arm being transmitted to the piston 102 so that it is pivoted from a "top dead center" position to a "bottom dead center" position in the space that it requires the cam rollers 126 to move from the low point 24 to the high point 22 as viewed in FIG. 5. Since there are three such high and low points in the cam groove, it will be obvious that each piston completes three full strokes for every revolution of the rotor.

It will of course be obvious that in order to withstand the internal pressures created by an explosion upon the injection of fuel into the port 7 and thereby into the combustion chamber 67 when the piston 101 is in the attitude illustrated in FIG. 1, the piston must be equipped with appropriate seal bands or "rings" 131 which are seated in an appropriate ring groove 131' formed in the surfaces of the piston. To insure that a seal is formed between the seal rings 131 and the associated sides of the rotor, the pressure of a compression and combustion is communicated through a channel 132 formed within the body of each piston, with the bottom of the ring groove 131' in which the seal rings are seated. Thus pressure behind the seal rings causes them to expand and impinge resiliently against the associated side walls 37 and 38 of the rotor. In this respect, and significantly different from the prior art, it should be noted that the seal rings 131 make contact with the rotor only over that limited excursion of the piston between top and bottom dead centers. The ring seals 131 do not come in contact with the end walls 4 and 6 of the housing, nor do the ring seals 131 come in contact with the internal peripheral surface 32 of the housing. Thus, there is minimum wear between the seal rings 131 and the associated surfaces against which they seal.

It is important in a rotary internal combustion engine, primarily because of the limited excursion of the piston within each of the associated combustion chambers, that means be provided for scavenging the products of combustion from the combustion chambers. To effect this end, as seen in FIG. 1, the extension 56 of each of the rotor divider sections 44, 46, 47, 48, 49 and 51 is provided with an opening 133 which lies sealed in the position of the piston 101 as viewed in FIG. 1, but which is opened into the combustion chamber in the position of the piston 102 in combustion chamber 61. Thus piston member 102 being at the bottom dead center position, flap valve 79 is closed and the compressed air in the compression cavity behind piston member 102 enters through port 133 into the combustion chamber 61, forcing or scavenging the products of combustion from the combustion chamber 61 and forcing them out of the exhaust port 8.

The rotor assembly thus formed is rotatably mounted in the housing 2 by means of appropriate bearing assemblies 136 at the rear end of the engine 137 at the forward end of the engine. The bearing assembly 136 includes an inner race 138 fitted to the outer periphery 139 of the outer bearing section 42 of the rotor shaft 39, a roller bearing 141 and an outer race 142 press fitted in the aperture 12 formed in the housing.

The bearing assembly 137 at the forward end of the engine is similar in construction, including an inner race 143, a roller bearing 144 and an outer race 146 press fitted in the aperture 13 formed in this end of the housing. To insure the integrity of the assembly, a jam nut 147 is threaded onto the closed end 148 of the rotor shaft, the jam nut locking the inner race 138 of the bearing 136 in proper position on the rotor shaft. To protect the bearing assembly 136 from dust and dirt, a dust cover 149 is provided detachably secured to the outer end of the housing as illustrated.

At the forward end of the housing, there is mounted on the forward section 41 of the rotor shaft 39 a timing cam 151 which is appropriately press fitted or keyed to the rotor shaft, and which provides an outer peripheral surface 152 in the form of a compound cam surface rotation of which effects radial displacement of a roller 153 appropriately journaled at the bottom end of a valve lifter 154. The valve lifter includes a push rod 156 having a head 157 thereon, and a spring 158 which presses against the head at one end and reacts against a closure plate 161 attached to the housing at the other end. Thus, as the rotor rotates, the timing cam 151 at appropriately timed intervals causes reciprocating movement of the push rod 156 to effect fuel injection at the appropriate time correlated to the position of each of the pistons within its associated combustion chamber. It will of course be understood that while only one push rod assembly has been illustrated, as many as is necessary to control the injection of fuel and water may be provided.

Also mounted on the forward end of the engine as illustrated in FIG. 2, is the drive mechanism necessary to drive the impeller shaft 82. Driving of the impeller shaft is effected by a gear 166 press fitted or keyed to the forward section 41 of the rotor shaft 39, and locked in this position by an appropriate jam nut 167. Meshing with the drive gear 166 is a pinion gear 168 which is appropriately mounted on a shaft 169 journaled for rotation on the bracket 96 of the housing on appropriate bearing assemblies 171 and 172. The end 173 of the shaft 169 projects from the bearing assembly 172 is provided with an appropriate pulley 174 on which is mounted a belt 176 which also engages a pulley 177 mounted on the forward end 178 of the impeller shaft 82. A jam nut 179 on the forward end of the impeller shaft insures proper positioning and locking of the pulley 177 on the impeller shaft. Thus, as the rotor is caused to rotate in a clockwise direction as viewed in FIGS. 1 and 2, the gear train formed by gears 166 and 168 and drive belt 176 causes the impeller shaft 82 to rotate in a counter-clockwise direction so as to forcefully pack air through the openings 78 formed in the mid-section of the rotor shaft 39.

It is expected that operation of the engine through rotation of the rotor and impeller shaft will cause the flow of considerable air through the engine. Inasmuch as such air is very likely to be contaminated with dust and other impurities, it is important to shield the gear train 166 and 168 and the associated timing cam 151 from being contaminated by such impurities. Accordingly, there is provided between the impeller 83 and the gear train 166 and 168 a dust cover and oil seal 181 that is appropriately secured to the forward end of the housing so as to be non-rotatable in relation to the gear 166 and timing cam 151.

Summarizing the operation of the rotary internal combustion engine of the invention, it should be noted that like most modern-day engines, the engine will be started through use of an appropriate starter motor (not shown) which is applied to effect rotation of the rotor shaft 39 through appropriate means, also not shown. Rotation of the rotor in a clockwise direction effects counter-clockwise rotation of the impeller shaft and impeller blades with the affect that air is drawn into the engine, channeled through ports 78 in the mid-section of the rotor shaft and caused to fill the cavity behind each of the pistons if such pistons are in a "top dead center" position, or caused to flow through the apertures 133 and through the combustion chamber so as to scavenge the products of combustion when the pistons are in the bottom dead center position.

It should be noted that in the cycle of operation, when air has been packed into the compression chamber behind each of the pistons in top dead center position, the flap valve 79 is caused to close when the associated piston reaches top dead center, the effect being to trap the charge of air behind the piston so that it will be compressed by movement of the piston toward a "bottom dead center" position. It is this charge of compressed air behind the piston that is caused to flow through the opening 133 and effect scavenging of the products of combustion from the combustion chamber.

Thus, upon completion of this cycle, there is left within the combustion chamber a charge of fresh air which is now conditioned for compression by movement of the piston in the opposite direction toward top dead center. As soon as compression of this trapped charge of air has occurred, and upon proper timing of the fuel injection system, a charge of fuel is injected through the ports 7, mixing with the air therein and, depending upon pressures and temperatures, either igniting automatically in the manner of a diesel engine, or in appropriate circumstances being caused to ignite by an appropriate ignitor mechanism such as a spark plug or glow plug.

Ignition of the air-fuel mixture causes an explosive increase in the pressure in the associated combustion chamber, causing a rotative force to be imposed against the rotor by exposing such expanding air and gas mixture to the face 54 of the associated divider section and against the bottom of the recess 107 formed in the forward edge of the piston. Such pressure will tend to cause pivotal movement of the piston in a counter-clockwise direction as viewed in FIG. 1, and any such counter-clockwise pivotal movement of the piston will be transmitted through the bolt 116 to the crank arm 123 and therethrough to the cam roller 126. Since the cam rollers work against the housing, and since the housing is stationary, it will be seen that the pressure build-up within the combustion chamber results in very limited pivotal movement of each of the pistons and a considerable rotative movement of the rotor against which the pressure is reacting. Such rotative motion of the rotor carries the splined bolt 116 in a circular path and forces the cam follower or roller 126 to follow the configuration of the cam groove in which it operates so as to control the pivotal movement of each of the pistons in relation to the extent of rotative movement of the rotor.

Referring to FIG. 1, and specifically to the piston 101, it will be noted that the curvature of the outer surface of this piston, and each of the others, conforms to the curvature of the forward edge 52 of the associated divider section but that the curvature of the outer periphery of each piston member possesses a shorter radius than the radius of the inner periphery 32 of the housing. The effect of this difference in radii is that when each piston member is in top dead center position as illustrated in FIG. 1, for the piston 101, there is a point approximately at the mid-point of the piston at which the outer peripheral surface of the piston and the inner periphery of the housing come into very close proximity, the spacing being measured in thousandths of an inch.

Additionally, the difference in curvature causes there to be a void in the combustion chamber associated with the leading edge of the piston and trailing edge of the associated divider section, shown in FIG. 1 to be also associated with the fuel injection port 7. Similarly, at the trailing edge of the piston, the forward or leading edge 186 of the divider section overlaps the trailing edge portion of the piston with the result that a void 187 is defined between the trailing edge portion of the piston and the inner periphery of the housing. This relationship of the parts of course is maintained for some distance in the circular path of the rotor, and certainly is maintained in point of time when the parts so related cause the void 187 to be opposite the water injection port 9. At this point in time, the timing cam 151 controls an injector mechanism (not shown) which causes the injection of a quantity of water into the void 187.

As soon as the leading edge 186 of the divider section has passed the water injection port 9, the void 187 is sealed off and the water is retained in this void until the fuel injection mechanism has been actuated to inject fuel into the combustion chamber void defined by the inner periphery of the housing and the recess 107. As soon as the explosion of air-fuel mixture occurs, the build-up of pressure and heat causes the water to vaporize with the result that the air-fuel mixture and surrounding parts are cooled so that combustion occurs at approximately 2,700° F. Additionally, the weight of the water vapor added to the weight of the products of combustion increases the impact or pressure exerted by the mixture against the rotor, thereby increasing the efficiency of the engine. Since introduction of the water and its vaporization causes operation of the engine at a cooler temperature, such temperatures do not reach the level required for the production of nitrous oxide, this compound being one of the pollutants that is particularily irritating in our atmosphere. It will of course be understood that no specific mechanisms have been illustrated for water injection and fuel injection, these devices being conventional in the art and there being many different types of such structures that could be incorporated to perform this function.

Figure 6:
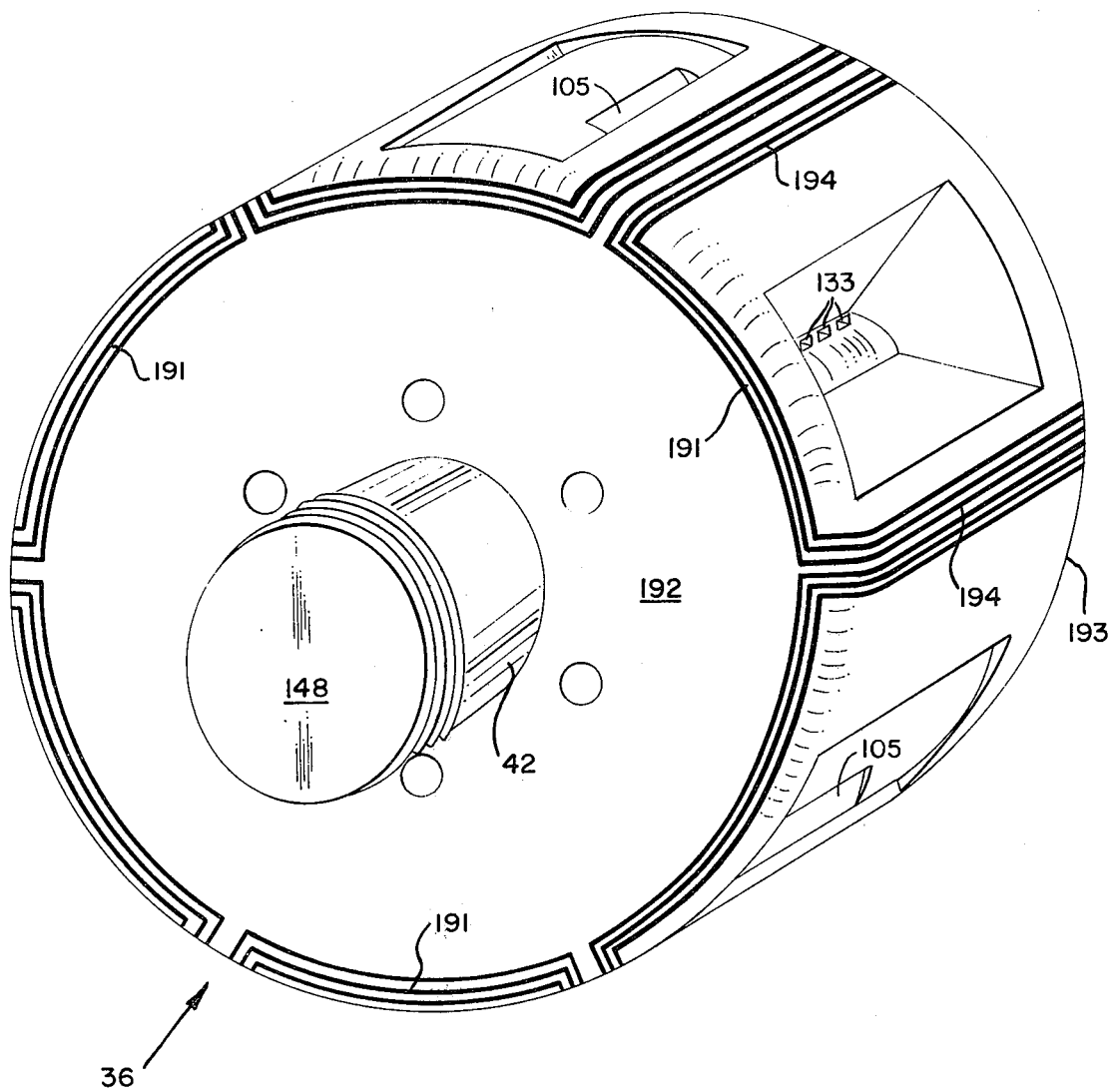
FIG. 6 is a perspective view of the assembled rotor shown apart from the housing.

It should also be understood that with respect to the relationship between the outer periphery of the rotor as an assembled unit and the inner periphery of the housing, there is need to provide an operating clearance between these members so as to minimize wear while at the same time sealing the space so as to maintain adequate pressures within the combustion chambers in the rotor. To this end, and referring to FIG. 6, it will be noted that appropriate seal rings 191 are provided engaging the outer surfaces 192 and 193 of the rotor, these seal rings preventing unwanted expansion of the products of combustion along the sides of the rotor in the space between these sides of the rotor and the corresponding or associated side of the housing. In like manner, the seal rings continue over the outer periphery of the rotor in portions 194 so as to prevent expansion of the products of combustion in a circular path from one combustion chamber to another. No attempt has been made to detail the construction of these seal rings, it being believed that such seal rings are readily available as state-of-the-art commercially available structures. It will of course be understood that the rings resiliently impinge against the inner periphery of the housing and the side walls thereof, such resilient impingement being insured by placement of conventional pressure springs (not shown) in the grooves beneath the rings.

From the foregoing it will be seen that a rotary internal combustion engine of relatively small size, say approximately 3 cubic feet and having an inside diameter of approximately 20 inches, has been provided which operates on a two stroke cycle in a way to provide for eighteen power modes in one revolution of the engine, each of the six pistons completing a two stroke cycle of operation three times within one revolution of the engine shaft. Thus, if each combustion chamber provides 63 cubic inches of volume, by conventional equations, it is found that the volume of six combustion chambers equals 378 cubic inches. Since each of the pistons completes three two stroke cycles of operation within one revolution of the engine shaft, the cubic displacement of the engine as a whole amounts to approximately 1134 cubic inches.

Again, using standards applied conventionally to diesel engines of four stroke cycle operation, say a Cummins Engine Model C-160 with a 464 cubic inch displacement, the maximum horsepower based on a revolutions per minute rating is about 160 hp at 2500 RPM. The usual ratio of horsepower to cubic displacement is 0.34 horsepower for one cubic inch of displacement. Accordingly this engine having 1134 cubic inches of displacement will develop approximately 385 horsepower at 1250 RPM. If it is considered that a conventional Cummins Model C-160 engine operating at approximately 2500 RPM delivers 162 horsepower, then it will be seen that the engine forming the subject matter of this invention operating at approximately 2500 RPM will develop approximately 770 horsepower.

It should also be noted that the design of this engine is not limited to operation with any specific fuel. It is intended that different types of fuels be used with the engine so as to provide maximum versatility. To this end, the fuel injectors constitute multi-fuel injectors, capable of injecting fuel when the pressure ratio amounts to approximately 25-to-1. It is intended that this engine will have a compression-ignition ratio above 17-to-1 with controlled burning of the air-fuel mixture by the addition of water vapor thereto so as to reduce the heat of combustion, increase the efficiency by adding the weight of the water vapor to the pressure exerted by the explosion of air-fuel mixture, and thus render the engine pollution free by maintaining the temperatures at a level below the level at which nitrous oxide is formed.

While the foregoing specification relates to an engine having six pistons each "firing" three times in one revolution, greater power could be achieved by increasing the number of pistons, say up to twelve, thus increasing the displacement and horsepower rating. It is also within the scope of this invention to modify the configuration of the cam groove so that each piston "fires" a greater number than three times in one revolution. Additionally, while I have chosen a specific configuration for the piston, other configurations thereof may be provided, so long as they function in the manner disclosed and are provided with seals as indicated. While the basic concept disclosed and described herein contemplates autoignition, in some instances, particularly where the volume of water injected reaches a maximum limit, it may be desirable to equip the engine with a glow plug or other type of ignitor to ignite the fuel mixture injected into the combustion chamber.

I claim:
1. A rotary internal combustion engine, comprising:
 a) an outer housing having a circular inner periphery;
 b) a rotor mounted for rotation within said housing, said rotor including
   1) a rotor shaft coaxially arranged within said housing and rotatable thereon,
   2) a radially extending rotor portion mounted on the rotor shaft and including cavities that extend between the outer periphery of said rotor and the rotor shaft;
 c) a piston pivotally mounted in each cavity in said rotor for movement between a position adjacent the outer periphery of said rotor and a position adjacent said rotor shaft, said piston dividing said cavity into a pair of air compression chambers, one of said chambers being a combustion chamber;
 d) means cooperatively engaging said rotor, said pistons, and said housing whereby rotation of said rotor in relation to said housing causes said pivotal movement of each said piston in its respective cavity;
 e) means for injecting water into one of said air compressed chambers;
 f) means for injecting fuel into one of said air compression chambers, the injection of said fuel following the injection of said water and being effected in each chamber at a time correlated to the positions of the other pistons in their respective cavities whereby combustion of the air-fuel charge in said chamber effects vaporization of the water contained therein and rotation of said rotor.

2. The combination according to claim 1, in which said rotor includes at least six such cavities each of which is equipped with a piston dividing the cavity into a pair of air compression chambers.

3. The combination according to claim 1, in which the cavities in said rotor are defined by a plurality of radially extending divider sections equally spaced circumferentially about the rotor, and end plates close the ends of said rotor so that each cavity is isolated from adjacent cavities.

4. The combination according to claim 1, in which means are provided on said rotor for controlling the passage of air from the inner periphery of said rotor to the outer periphery thereof to effect scavenging of products of combustion from said engine.

5. The combination according to claim 1, in which said rotor shaft is hollow, and means are provided operatively associated with each cavity providing selective communication air between the interior of said rotor shaft and the cavities in said rotor.

6. The combination according to claim 1, in which said means cooperatively engaging the rotor, said pistons and said housing comprises a pair of pivot arms associated with each piston, each said pivot arm including one end journaled for pivotal movement in the associated wall of said rotor and fixed to said piston, the opposite end of said pivot arm rollably engaging the associated side wall of the housing.

7. The combination according to claim 1, in which opposite side walls of said housing are formed with cam grooves, and said means cooperatively engaging said rotor, piston and housing includes means rollably interengaged with said cam grooves.

8. The combination according to claim 1, in which means are provided controlling movement of said pistons whereby all of the pistons in the assembly complete three cycles of two stroke operation with each revolution of the engine.

9. The combination according to claim 1, in which a timing cam is provided mounted on said rotor shaft and operative to control the injection of fuel and water into said compression chamber at predetermined timed intervals.

10. The combination according to claim 1, in which said rotor shaft is hollow, impeller means are rotatably mounted in said hollow rotor shaft, and means are associated with said rotor shaft for effecting rotation of said impeller means in a direction opposite to the direction of rotation of said rotor shaft.

11. The combination according to claim 1, in which the inner periphery of said housing is formed with a centrally disposed peripheral channel therein, and said radially extending rotor portion extends into said channel.

12. The combination according to claim 1, in which said rotor has a circular outer periphery rotatable in close proximity to the inner periphery of said housing.

13. The combination according to claim 1, in which seal rings are provided mounted on said rotor and resiliently impinging against the inner periphery of said housing.

14. The combination according to claim 1, in which seal rings are provided mounted on each said piston and resiliently impinging against the inner periphery of the associated cavity to seal one compression chamber from the other in each cavity.

15. The combination according to claim 1, in which each piston is provided with at least one seal ring groove, a seal ring in said groove, and air passage means are provided for channeling air under pressure into said seal ring groove beneath said seal ring.

16. The combination according to claim 1, in which said cooperative engagement between the rotor, pistons and housing results in three two-stroke cycles for each piston in a single revolution of the rotor.

17. The combination according to claim 1, in which one of said air compression cavities is divided by said piston into a first chamber constituting a water reservoir and a second chamber constituting a fuel injection chamber.

18. The combination according to claim 1, in which each piston in each cavity is provided with a leading edge defined between a generally flat front face and a curved face, said leading edge being provided with a combustion reaction recess formed therein.

19. The combination according to claim 1, in which each piston in each cavity is provided with a generally flat front face intercepted by a convex curved face having its center of revolution coincident with the pivotal axis of said piston, one wall of the cavity in which the piston lies having a complementary concave surface.

20. The combination according to claim 1, in which said rotor shaft comprises an elongated hollow tube opposite end portions of which constitute bearing supports for rotatably supporting the rotor on the housing, and an intermediate portion of said rotor shaft is apertured to provide for the selective passage of air between the interior of said shaft and the interiors of said cavities.

21. The combination according to claim 1, in which said housing is formed with a cylindrical wall having an inner peripheral channel therein coaxially disposed about the axis of rotation of said rotor shaft, annular end plates perpendicular to the axis of rotation of said rotor shaft and axially spaced apart, the outer peripheries of said annular end plates being fixed to said cylindrical wall and the inner peripheries thereof forming spaced coaxial support surfaces for said rotor shaft, mirror image endless cam grooves formed in said annular end plates in the facing surfaces thereof, each said cam groove defining a track varying in distance from the rotational axis of said rotor shaft, said means cooperative engaging said rotor, pistons and housing including a pivot lever associated with each piston and including one end portion journaled on said rotor and fixed to the associated piston and another end portion engaging the associated cam groove whereby rotation of said rotor and rotor shaft effects pivotal movement of each piston within its associated cavity.

22. The combination according to claim 1, in which each said divider section comprises a wall-like member disposed between a pair of axially aligned end plates and includes a leading face having a concave curvature, a convex face remote from the axis of rotation of the rotor and having a curvature complementing the curvature of the inner periphery of the housing, and a generally flat trailing face, said leading and trailing faces merging into a generally semi-cylindrical extension coaxially arranged about the pivotal axis of the associated piston.

23. The combination according to claim 3, in which said cavities and said pistons have complementarily curved surfaces the center of revolution of both of which is the axis of rotation for said piston.

24. The combination according to claim 4, in which said means for controlling the passage of air comprises a flap valve and a valve seal formed on said rotor shaft, said rotor is hollow, and said flap valve controls the passage of air therethrough.

25. The combination according to claim 5, in which said means controlling the passage of air into said cavities is operative to admit air from the interior of said rotor shaft into one of said pair of air compression chambers in each cavity during a portion of the cycle of said engine, subsequently operable to seal the inlet port for such air and permit compression of said air by movement of said piston in a power stroke, and upon completion of said power stroke causing said compressed air to pass through said combustion chamber to scavenge the products of combustion therefrom.

26. The combination according to claim 17, in which said first chamber forms a part of the combustion chamber.

27. The combination according to claim 19, in which seal rings are disposed between said convex curved face of each piston and the associated concave surface of the divider section.

* * * * *

UNITED STATES PATENT OFFICE
CERTIFICATE OF CORRECTION

Patent No. 4,072,132                    Dated February 7, 1978

Inventor(s) Chester A. Lindros

It is certified that error appears in the above-identified patent and that said Letters Patent are hereby corrected as shown below:

Column 3, line 44, "combination" should read --combustion--;

line 62, after "least" insert --six--.

Column 4, line 20, "It" should read --it--.

Column 6, line 62, after "point" insert --in--.

Column 8, line 36, before "mounted" change "approximately" to --appropriately--.

Column 9, line 51, change "104", second occurence, to --105--.

Column 11, line 21, before "compression" delete --a--;

line 57, after "engine" insert --and--.

Column 12, line 36, after "169" insert --which--.

Column 13, line 38, change "107" to --105--.

Column 16, Claim 1, line 24, "compressed" should read --compression--;

Claim 5, line 51, before "air" insert --of--.

UNITED STATES PATENT OFFICE
CERTIFICATE OF CORRECTION

Patent No. 4,072,132　　　　　　　　　　Dated February 7, 1978

Inventor(s) Chester A. Lindros

It is certified that error appears in the above-identified patent and that said Letters Patent are hereby corrected as shown below:

Column 17, Claim 15, line 33, after "ring" insert

--is seated--.

Column 18, Claim 21, line 16, change "cooperative" to

--cooperatively--.

Signed and Sealed this

Twentieth Day of June 1978

[SEAL]

Attest:

RUTH C. MASON　　　　　　　　　　DONALD W. BANNER
Attesting Officer　　　　　　　　Commissioner of Patents and Trademarks